(12) United States Patent
Karpenko

(10) Patent No.: US 11,124,033 B2
(45) Date of Patent: Sep. 21, 2021

(54) DAMPENER INSERT

(71) Applicant: Ford Global Technologies, LLC, Dearborn, MI (US)

(72) Inventor: Yuri Anatoly Karpenko, Brighton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/258,928

(22) Filed: Jan. 28, 2019

(65) Prior Publication Data

US 2020/0238778 A1    Jul. 30, 2020

(51) Int. Cl.
| | | |
|---|---|---|
| *F16F 7/01* | (2006.01) | |
| *B60G 13/00* | (2006.01) | |
| *F01D 25/04* | (2006.01) | |
| *F16D 65/00* | (2006.01) | |

(52) U.S. Cl.
CPC ........... *B60G 13/001* (2013.01); *F01D 25/04* (2013.01); *F16D 65/0012* (2013.01); *F16F 7/01* (2013.01); *B60G 2204/128* (2013.01); *B60G 2204/1302* (2013.01); *F16F 2222/04* (2013.01); *F16F 2222/08* (2013.01); *F16F 2226/048* (2013.01)

(58) Field of Classification Search
CPC ...... F16F 7/01; F16F 2222/04; F16F 2222/08; F16F 2226/048; F16D 65/0012; F01D 25/04; B60G 13/001; B60G 2204/1302; B60G 2204/128
See application file for complete search history.

(56) References Cited

U.S. PATENT DOCUMENTS

| | | | | |
|---|---|---|---|---|
| 2,122,839 A | * | 7/1938 | Guy | B60G 11/113 403/226 |
| 3,696,891 A | * | 10/1972 | Poe | F16F 7/00 188/268 |
| 4,011,929 A | * | 3/1977 | Jeram | F16F 7/01 188/268 |
| 4,756,341 A | * | 7/1988 | Takehana | D03D 47/34 139/435.1 |
| 5,257,680 A | * | 11/1993 | Corcoran | F16F 7/02 188/129 |
| 5,855,257 A | * | 1/1999 | Wickert | F16D 65/0006 188/218 A |
| 6,547,049 B1 | | 4/2003 | Tomlinson | |
| 6,681,905 B2 | * | 1/2004 | Edmondson | B60G 13/001 188/130 |
| 7,051,618 B2 | * | 5/2006 | Anton | B29C 66/5344 464/180 |

(Continued)

FOREIGN PATENT DOCUMENTS

| | | |
|---|---|---|
| CN | 101725656 B | 6/2012 |
| CN | 204025493 U | 12/2014 |

(Continued)

*Primary Examiner* — Melody M Burch
(74) *Attorney, Agent, or Firm* — Raymond L. Coppiellie; Bejin Bieneman PLC

(57) ABSTRACT

An assembly includes a vehicle component. The assembly includes a body embedded in the vehicle component, the body defining a chamber and having an outer surface defining an intrusion extending toward the chamber and engaged with the vehicle component. The assembly includes a plurality of dampening particles within the chamber.

17 Claims, 4 Drawing Sheets

(56) References Cited

U.S. PATENT DOCUMENTS

| | | | | |
|---|---|---|---|---|
| 7,798,296 | B2* | 9/2010 | Iwashita | F16F 9/145 |
| | | | | 188/290 |
| 8,091,609 | B2 | 1/2012 | Aase et al. | |
| 2003/0146061 | A1* | 8/2003 | Tournier | E05D 11/084 |
| | | | | 188/373 |
| 2008/0185249 | A1* | 8/2008 | Schroth | B22D 19/00 |
| | | | | 188/381 |
| 2017/0335915 | A1* | 11/2017 | Nyboer | F16F 7/01 |
| 2018/0320749 | A1* | 11/2018 | Takahashi | F16F 9/12 |

FOREIGN PATENT DOCUMENTS

| | | | | |
|---|---|---|---|---|
| CN | 106004227 | A | 10/2016 | |
| CN | 107542847 | A | 1/2018 | |
| CN | 107956839 | A | 4/2018 | |
| DE | 4016223 | A * | 11/1991 | |
| WO | WO-2017145857 | A1 * | 8/2017 | F16F 9/535 |

\* cited by examiner

DAMPENER INSERT

BACKGROUND

A dampener may be fixed to a component of a vehicle to reduce vibration of such component. The dampener may include multiple parts with surfaces that rub against each other when the component is subject to a force or acceleration. Friction between the surfaces that rub against each other dissipates energy to reduce vibration of the component.

DETAILED DESCRIPTION

Figure 1:
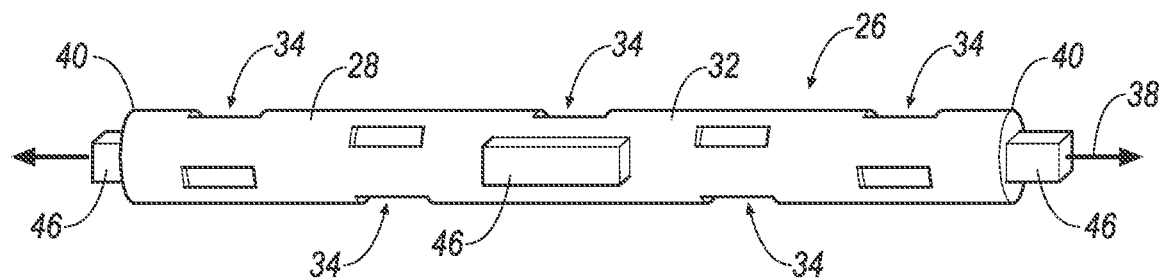
FIG. 1 is a perspective view of a dampener.

An assembly includes a vehicle component. The assembly includes a body embedded in the vehicle component, the body defining a chamber and having an outer surface defining an intrusion extending toward the chamber and engaged with the vehicle component. The assembly includes a plurality of dampening particles within the chamber.

The intrusion may include a slot extending to the chamber and the vehicle component may extend through the slot from the outer surface into the chamber.

The vehicle component in the chamber may be wider than the slot.

The vehicle component may surround the body.

The chamber may be elongated along an axis, and the assembly may further include a support elongated along the axis within the chamber and fixed to the body.

The dampening particles may abut and circumferentially surround the support relative to the axis.

The dampening particles may be between the body and the support and abut the support.

A dampener includes a monolithic body defining a chamber and having a first portion and a second portion adjacent and thinner than the first portion. The dampener includes a plurality of dampening particles within the chamber and abutting the first portion and the second portion.

The monolithic body may be elongated along an axis and have a third portion thinner than the first portion, the first portion may be between the second portion and the third portion along the axis.

The monolithic body may be cylindrical and have a third portion thinner than the first portion and circumferentially spaced from the second portion, the first portion may be between the second portion and the third portion.

The monolithic body may be elongated between ends, and the dampener may further include a support within the chamber and fixed to the ends.

The monolithic body may be elongated between ends, and the dampener may further include a tab extending at each end away from the chamber.

The monolithic body may be cylindrical, and the dampener may further include a tab extending radially from the monolithic body away from the chamber.

A dampener includes a monolithic body defining a chamber and having an inner surface including protrusions extending into the chamber. The dampener includes a plurality of dampening particles within the chamber and surrounding and abutting the protrusions.

The monolithic body may have an outer surface including intrusions extending toward the chamber, the intrusions aligned with and opposite the protrusions.

The dampener may include a support within the chamber and fixed to the monolithic body, the support spaced from the protrusions and surrounded by the dampening particles.

The dampening particles may abut the support and be between the support and the protrusions.

The protrusions may surround the support.

The monolithic body may be circumferential in cross section and the protrusions may be spaced circumferentially about the monolithic body.

The monolithic body may be cylindrical, and the protrusions may extend radially into the chamber.

With reference to the Figures, wherein like numerals indicate like parts throughout the several views, an assembly 20 for reducing noise and vibration of a vehicle includes a vehicle component 24. The assembly 20 includes a dampener 26 having a body 28 embedded in the vehicle component 24, the body 28 defining a chamber 30 and having an outer surface 32 defining an intrusion 34 extending toward the chamber 30 and engaged with the vehicle component 24. The dampener 26 includes a plurality of dampening particles 36 within the chamber 30.

Movement, such as vibration, of the vehicle component 24 is transmitted through the body 28 to the dampening particles 36 and may cause movement of the dampening particles 36. Movement of the dampening particles 36 relative to each other and relative to other parts of the dampener 26, such as the body 28, generates friction therebetween. The friction dissipates energy from the vibration of the vehicle component 24 and reduces a magnitude of such vibration.

The vehicle may be any type of passenger or commercial automobile such as a car, a truck, a sport utility vehicle, a crossover vehicle, a van, a minivan, a taxi, a bus, etc.

The vehicle component 24 is a component of the vehicle, an assembly of the vehicle, a subassembly of the vehicle, etc. For example, the vehicle component 24 may be a frame member, a suspension component (such as a trailing arm), a brake component (such as a rotor), etc. The vehicle component 24 may be metal, ceramic, or any suitable material.

The dampener 26 resists changes in movement, especially those from oscillating motion, e.g., vibration. The dampener 26 absorbs and dissipates energy from such movement, e.g., through friction of the dampening particles 36 rubbing against each other and other parts of the dampener 26.

The body 28 of the dampener 26 may be monolithic, i.e., a one-piece unit without any fasteners, joints, welding, adhesives, etc., fixing portions of the body 28 to each other. The body 28 may be elongated along an axis 38. In other words, the body 28 may be elongated between ends 40, the axis 38 extending between such ends 40. For example, the body 28 may be cylindrical, e.g., the outer surface 32 being circular in cross section perpendicular to the axis 38 and extending between the ends 40. The body 28 defines the chamber 30. In other words, the body 28 may enclose the chamber 30. The chamber 30 may be elongated along the axis 38. The body 28 may be metal, or any suitable material. The body 28 and the vehicle component 24 may be a same material, or different materials.

The outer surface 32 faces away from the chamber 30. The outer surface 32 may define one or more intrusions 34 extending from the outer surface 32 toward the chamber 30. The intrusions 34 aid in fixing the body 28 to the vehicle component 24, e.g., by providing increased friction, a mechanical lock, etc., between the body 28 and the vehicle component 24. The intrusions 34 may be part way into the body 28, i.e., terminating prior to reaching the chamber 30 as shown in FIGS. 2, 3, 7 and 8, or may extend fully through the body 28, i.e., extending to the chamber 30, e.g., as slots 42 shown in FIG. 5. The intrusions 34 may be machined, cast, crimped, forged, pressed, etc., in the outer surface 32.

The body 28 includes an inner surface 44 opposite the outer surface 32. The inner surface 44 faces toward the chamber 30.

The dampener 26 may include one or more tabs 46 extending from the body 28 and away from the chamber 30. The tabs 46 aid in securing the dampener 26 to the vehicle component 24 and transmitting vibration therebetween. For example, tabs 46 may extend at each end 40 away from the chamber 30, e.g., along the axis 38. As another example, tabs 46 may extend radially from the body 28 away from the chamber 30, e.g., perpendicular to the axis 38. The tabs 46 may be metal, or any suitable material. The tabs 46 and the body 28 may be a same material, or different materials. The tabs 46 and the body 28 may be monolithic.

The dampener 26 may include a support 48 within the chamber 30. The support 48 increases a strength of the dampener 26 and aids in transferring vibration, e.g., from the ends 40, to the dampening particles 36. The support 48 may be elongated along the axis 38, e.g., between the ends 40. The support 48 may be fixed to the body 28, e.g., to the ends 40. For example, the support 48 may be fastened, welded, etc., to the ends 40. As another example, the support 48 and the ends 40 of the body 28 may be monolithic. The support 48 may be spaced from the body 28 between the ends 40. In other words, the chamber 30 may surround the support 48, e.g., circumferentially about the axis 38, as shown in FIGS. 3 and 8.

The dampening particles 36 move within the chamber 30, generating friction and dissipating energy with such movement. The dampening particles 36 are solid granules of material. The dampening particles 36 frictionally move with respect to each other and the inner surface 44 of the body 28. For example, each particle may be a dampeningly material that is 0.1 to 1 millimeters in diameter, in width, etc. The dampening particles may include particles of varying size relative to each other. The varying size of the dampening particles 36 reduces a possibly of the dampening particles 26 sticking to each other. The dampening material may be metal, ceramic, plastic, or any suitable material. The dampening particles 36 may have a higher melting temperature than the body 28. The dampening particles 36 may surround the support 48, e.g., circumferentially relative to the axis 38 between the body 28 and the support 48. The dampening particles 36 may abut the support 48 and the inner surface 44 of the body 28, e.g., to transfer vibration and generate friction therebetween.

Figure 2:
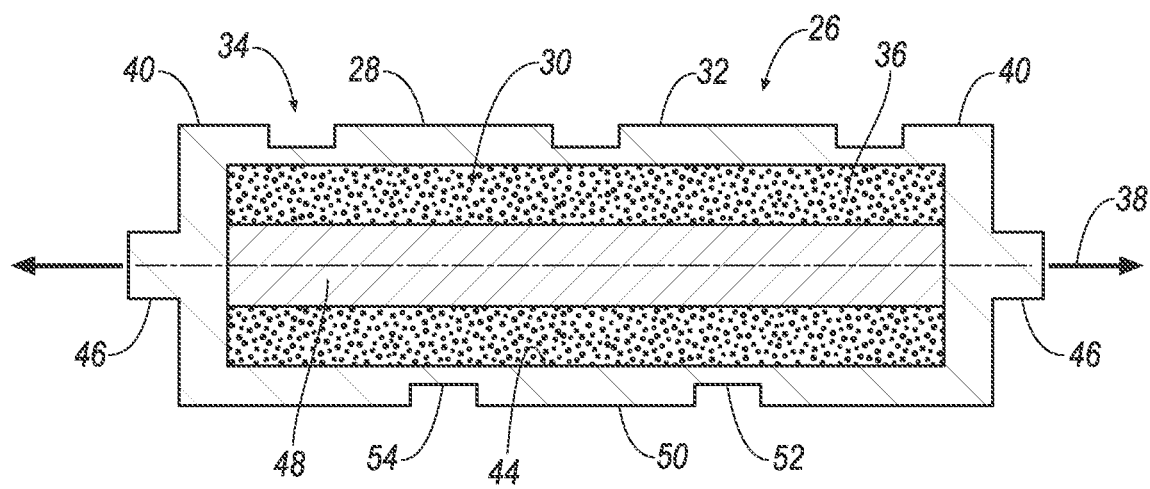
FIG. 2 is a cross section along an axis of the dampener of FIG. 1.
Figure 3:
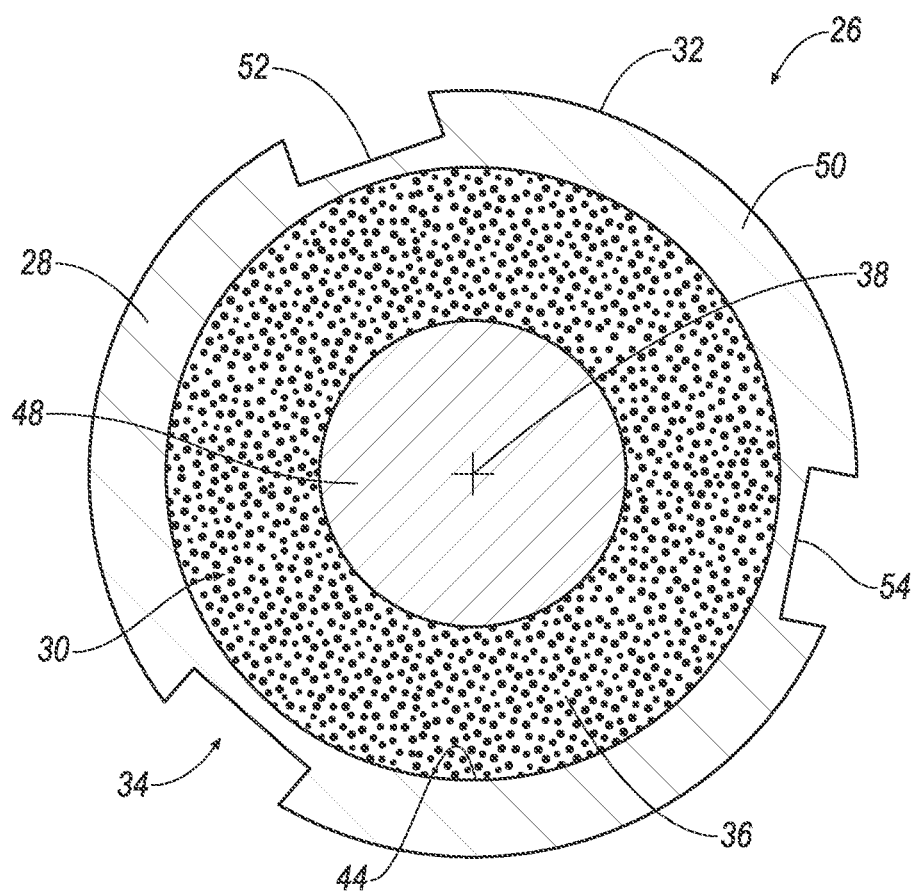
FIG. 3 is a cross section perpendicular to the axis of the dampener of FIG. 1.

With reference to the embodiment shown in FIGS. 1-3, the body 28 may have a first portion 50 and a second portion 52 adjacent the first portion 50. The second portion 52 may be thinner than the first portion 50. The body 28 may have a third portion 54 adjacent the first portion 52. The third portion 54 may be thinner than the first portion 50. In other words, a distance between the outer surface 32 and the inner surface 44 of the body 28 at the second portion 52 and the third portion 54 may be less than a distance between the outer surface 32 and the inner surface 44 of the body 28 at the first portion 50. The portions may be arraigned along the axis 38. For example, the second portion 52 may be spaced from the third portion 54 along the axis 38, and the first portion 50 may be between the second portion 52 and the third portion 54, e.g., as shown in FIG. 2. The portions may be arraigned about the axis 38. For example, the third portion 54 may be circumferentially spaced from the second portion 52 about the axis 38, and the first portion 50 may be between the second portion 52 and the third portion 54, e.g., as shown in FIG. 3. The dampening particles 36 may abut the portions 50, 52, 54. The intrusions 34 may be at the second portion 52 and the third portion 54. The adjectives "first," "second," "third," etc., are used throughout this document as identifiers and are not intended to signify importance or order.

Figure 6:
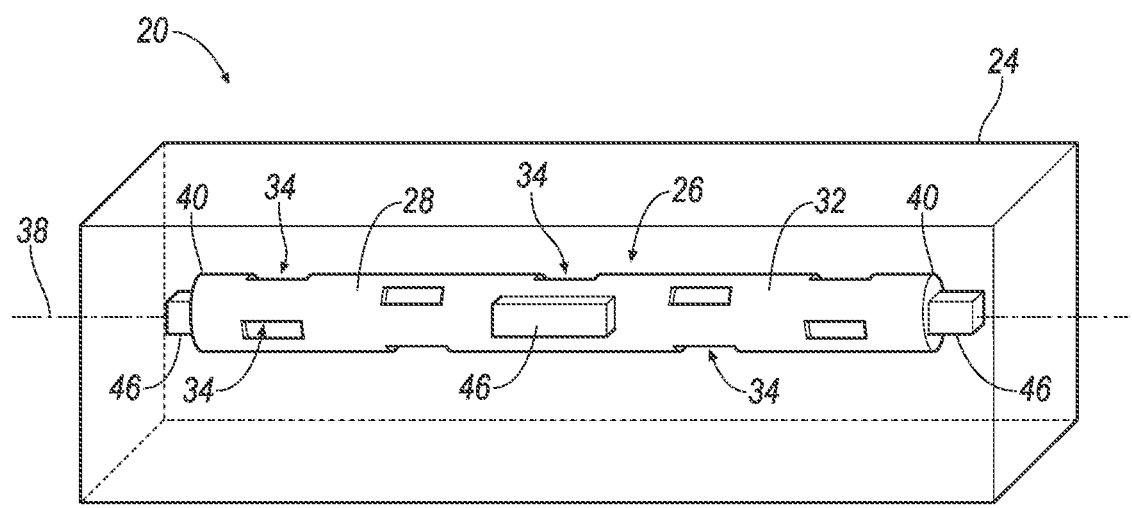
FIG. 6 is a perspective view of a dampener embedded in a vehicle component.
Figure 7:
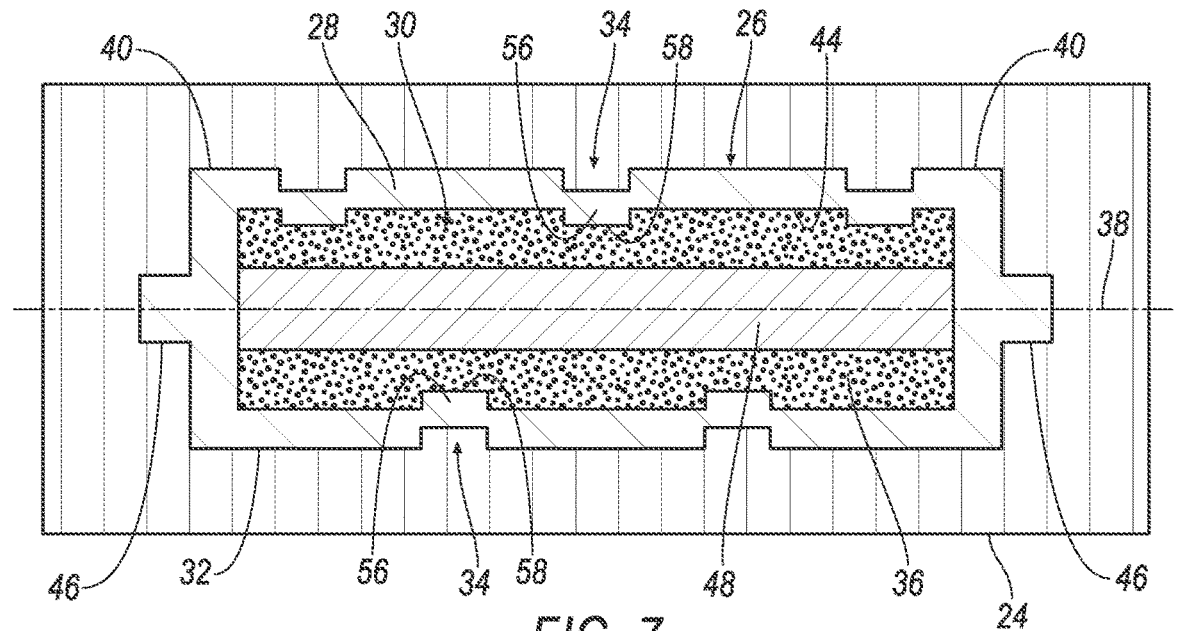
FIG. 7 is a cross section along an axis of the dampener of FIG. 6.
Figure 8:
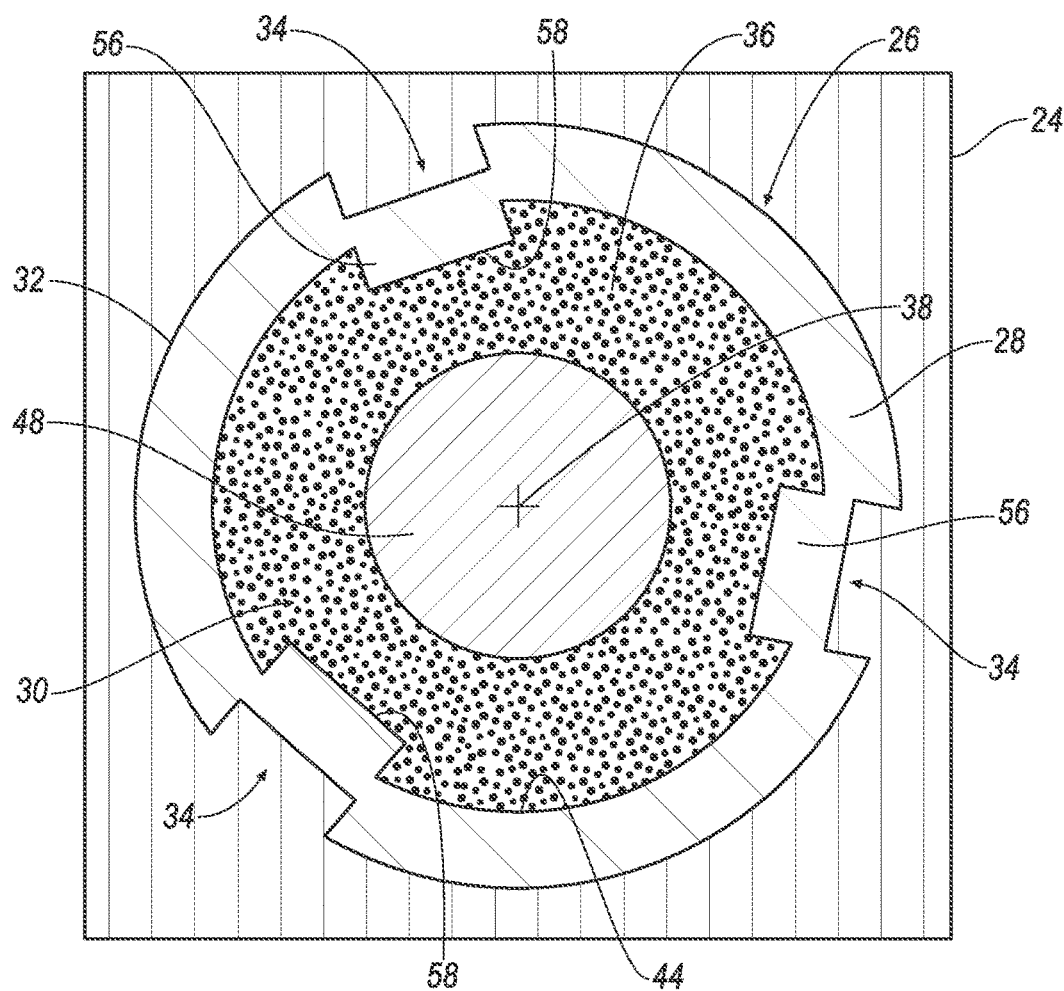
FIG. 8 is a cross section perpendicular to the axis of the dampener of FIG. 6.

With reference to the embodiment shown in FIGS. 6-8, the inner surface 44 of the body 28 may include protrusions 56 extending into the chamber 30. The protrusions 56 aid in transferring motion from the body 28 to the dampening particles 36. The protrusions 56 may extend radially into the chamber 30, e.g., toward the support 48. The protrusions 56 may extend to distal ends 58. The distal ends 58 of protrusions 56 may be spaced from the support 48. The protrusions 56 may surround the support 48. For example, the protrusions 56 may be spaced circumferentially about the body 28. The intrusions 34 may be aligned with and opposite the protrusions 56. For example, crimping the body 28 may simultaneously produce one of the intrusions 34 and one of the protrusions 56. The protrusions 56 are surrounded by the dampening particles 36. The dampening particles 36 abut the protrusions 56, e.g., to transfer vibration therebetween. The dampening particles 36 may be between the support 48 and the protrusions 56, e.g., radially relative to the axis 38.

With reference the embodiments shown in to FIGS. 4-8, the dampener 26 may be embedded in the vehicle component 24. Embedding the dampener 26 in the vehicle component 24 increases efficiency of transferring vibration from the vehicle component 24 to the dampener 26, and decreases downstream manufacturing processes, such as machining holes in the vehicle component 24 to fix the dampener 26 to the vehicle component 24. For example, the vehicle component 24 may surround the body 28 of the dampener 26. In other words, the body 28 of the dampener 26 may be encapsulated within the vehicle component 24. The vehicle component 24 may completely surround the body 28, e.g., extending circumferentially about the body 28 relative to the axis 38, and extending beyond and covering the ends 40.

The intrusions 34 of outer surface 32 of the body 28 are engaged with the vehicle component 24. Engagement of the intrusions 34 and the vehicle component 24 increases efficiency of transferring vibration from the vehicle component 24 to the dampener 26, and aids in fixing the dampener 26 to the vehicle component 24. For example, the vehicle component 24 may extend into the intrusions 34 and abut the body 28 of the dampener 26 therein.

Figure 4:
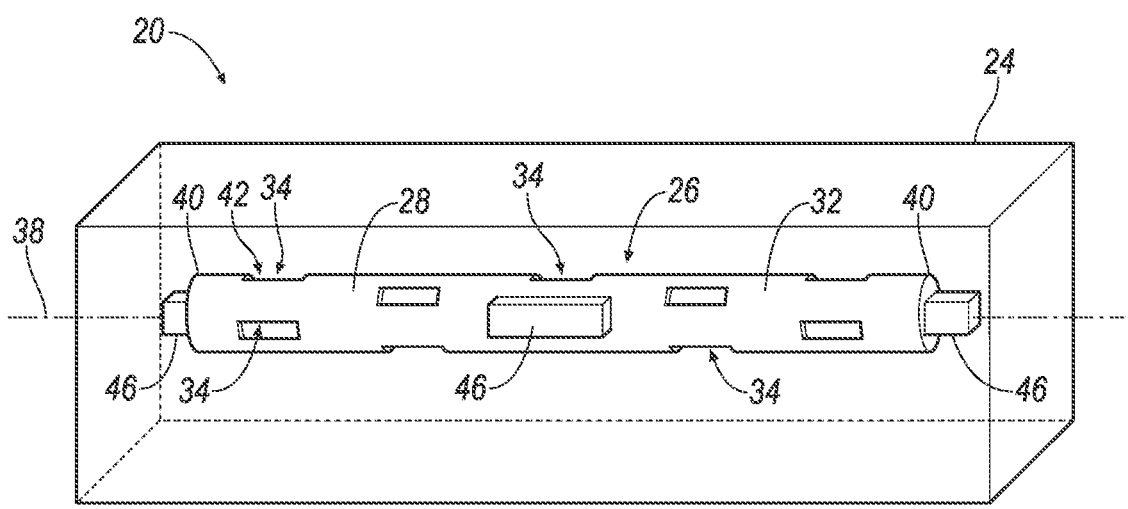
FIG. 4 is a perspective view of the dampener of FIG. 1 embedded in a vehicle component.
Figure 5:
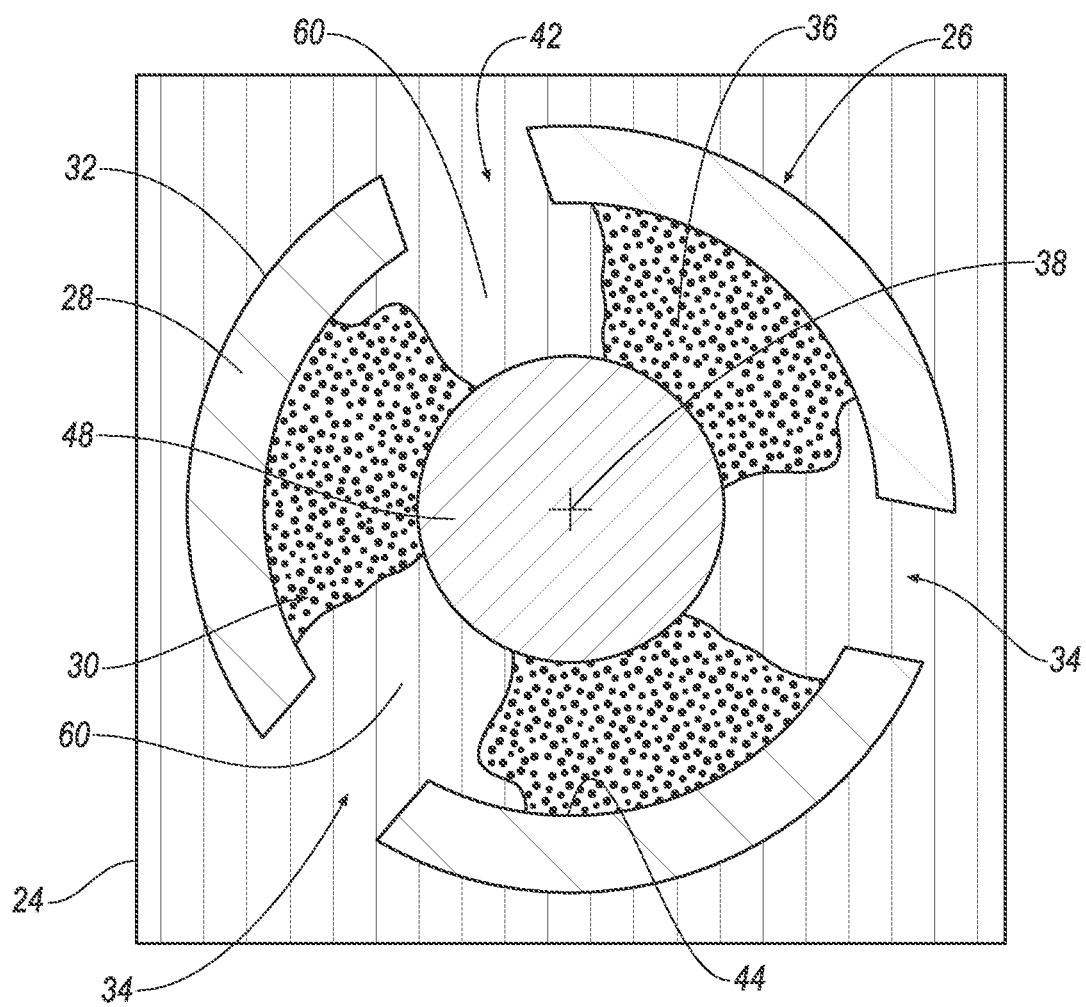
FIG. 5 is a cross section of the dampener and vehicle component of FIG. 4.

The dampener 26 illustrated in FIGS. 4 and 5 is the dampener 26 of FIGS. 1-3 embedded in the vehicle component 24. The dampener 26 may be embedded in the vehicle component 24 by casting the vehicle component 24 around the dampener 26. For example, to manufacture the assembly 20 shown in FIGS. 4 and 5, the dampener 26 may be supported within a mold, and the mold may then be filled with molten material. The molten material may melt the second portions 52, enlarging the intrusion 34 to slots 42 extending to the chamber 30. The molten material may flow through the slots 42 into the chamber 30. The molten material may abut the support 48. The molten material may cool and solidify as the vehicle component 24.

With continued reference to FIG. 5, a portion 60 of the vehicle component 24 may extend though the slot 42 from the outer surface 32 into the chamber 30. The portion 60 of the vehicle component 24 in the chamber 30 may be wider than the slot 42, e.g., inhibiting removal of the portion 60 of the vehicle component 24 from the chamber 30 and/or slot 42. The portion 60 of the vehicle component 24 within the chamber 30 may abut the support 48. The portion 60 may be fixed to the support 48, e.g., the molten material may bond to the support 48 as the material cools.

When the assembly 20 is installed in the vehicle, the vehicle component 24 may vibrate during normal operation of the vehicle. The vibration may originate from suspension, powertrain, braking, steering or other components. Such vibration may be transferred to the vehicle component 24. The vibration may be transmitted to the dampening particles 36, e.g., via the inner surface 44 of the body 28, the protrusions 56, the support 48, the portions 60 of the vehicle component 24 extending through the slots 42, etc. The vibration may cause movement of the dampening particles 36. Friction from such movement, e.g., between the dampening particles 36 and other dampening particles 36, the body 28, the support 48, the portions 60 of the vehicle component 24 extending through the slots 42, etc., dissipates kinetic energy from the vibration and reduces a magnitude of such vibration. Reducing the magnitude of vibration may increase comfort for an occupant of the vehicle, e.g., by reducing noise in a passenger cabin of the vehicle.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
   a vehicle component;
   a body embedded in the vehicle component, the body enclosing and surrounding a chamber, the chamber elongated along an axis, the body extending along an entirety of the chamber along the axis, the body having an outer surface defining an intrusion extending toward the chamber and engaged with the vehicle component; and
   a plurality of dampening particles within the chamber, each of the dampening particles having a size of 0.1 to 1 millimeters.

2. The assembly of claim 1, wherein the intrusion includes a slot extending to the chamber and the vehicle component extends through the slot from the outer surface into the chamber.

3. The assembly of claim 2, wherein the vehicle component in the chamber is wider than the slot.

4. The assembly of claim 1, wherein the vehicle component surrounds the body.

5. The assembly of claim 1, further comprising a support elongated along the axis within the chamber and immovably fixed to the body.

6. The assembly of claim 5, wherein the dampening particles abut and circumferentially surround the support relative to the axis.

7. A dampener, comprising:
   a monolithic body defining a chamber, the monolithic body elongated between ends along an axis and having a first portion between the ends and a second portion between the ends adjacent and thinner than the first portion, the monolithic body is cylindrical and has a third portion thinner than the first portion, the third portion circumferentially spaced from the second portion about the axis, the first portion between the second portion and the third portion about the axis; and
   a plurality of dampening particles within the chamber and abutting the first portion and the second portion, each of the dampening particles having a size of 0.1 to 1 millimeters.

8. The dampener of claim 7, further comprising a support within the chamber and immovably fixed to the ends.

9. The dampener of claim 7, further comprising a tab extending at each end away from the chamber, the tabs being monolithic with the body.

10. A dampener, comprising:
    a monolithic body elongated between ends along an axis, the monolithic body defining a chamber and having an inner surface including protrusions extending into the chamber;
    a plurality of dampening particles within the chamber and surrounding and abutting the protrusions, each of the dampening particles having a size of 0.1 to 1 millimeters; and
    a support within the chamber and immovably fixed to the monolithic body, the support spaced from the protrusions and surrounded by the dampening particles.

11. The dampener of claim 10, wherein the monolithic body has an outer surface including intrusions extending toward the chamber, the intrusions aligned with and opposite the protrusions.

12. The dampener of claim 10, wherein the dampening particles abut the support and are between the support and the protrusions.

13. The dampener of claim 10, wherein the protrusions surround the support.

14. The dampener of claim 10, wherein the monolithic body is circumferential in cross section and the protrusions are spaced circumferentially about the monolithic body.

15. The dampener of claim 10, wherein the monolithic body is cylindrical, and the protrusions extend radially into the chamber.

16. The assembly of claim 1, wherein the dampening particles are of varying size relative to each other.

17. The assembly of claim 1, wherein the vehicle component is a brake rotor.

* * * * *